US012100309B2

(12) United States Patent
Lewis

(10) Patent No.: US 12,100,309 B2
(45) Date of Patent: Sep. 24, 2024

(54) SYSTEM AND METHOD FOR REUSABLE DIGITAL VIDEO TEMPLATES INCORPORATING CUMULATIVE SEQUENTIAL ITERATION TECHNIQUE IN MUSIC EDUCATION

(71) Applicant: John Eric Lewis, Ryton (GB)

(72) Inventor: John Eric Lewis, Ryton (GB)

(*) Notice: Subject to any disclaimer, the term of this patent is extended or adjusted under 35 U.S.C. 154(b) by 458 days.

(21) Appl. No.: 17/415,614

(22) PCT Filed: Dec. 19, 2019

(86) PCT No.: PCT/GB2019/053638
§ 371 (c)(1),
(2) Date: Jun. 17, 2021

(87) PCT Pub. No.: WO2020/128494
PCT Pub. Date: Jun. 25, 2020

(65) Prior Publication Data
US 2022/0058978 A1 Feb. 24, 2022

(30) Foreign Application Priority Data
Dec. 21, 2018 (GB) ..................................... 1820958

(51) Int. Cl.
*G09B 15/02* (2006.01)
*G09B 5/02* (2006.01)
(Continued)

(52) U.S. Cl.
CPC ............ *G09B 15/023* (2013.01); *G09B 5/02* (2013.01); *G09B 5/065* (2013.01); *G09B 15/04* (2013.01);
(Continued)

(58) Field of Classification Search
CPC ........ G09B 15/023; G09B 5/02; G09B 5/065; G09B 15/04; G10G 7/00; G10H 1/0008; G10H 2210/061; G10H 2210/375
See application file for complete search history.

(56) References Cited

U.S. PATENT DOCUMENTS 5,982,425 A * 11/1999 Allen ....................... H04N 9/64
348/E9.037
7,977,560 B2 * 7/2011 Marcus .................... G09B 5/04
84/649

(Continued)

FOREIGN PATENT DOCUMENTS

WO 2012051605 A2 4/2012

OTHER PUBLICATIONS

International Search Report and Written Opinion for PCT Application No. PCT/GB2019/053638 dated Feb. 21, 2020.
(Continued)

*Primary Examiner* — Robert W Horn
(74) *Attorney, Agent, or Firm* — Burns & Levinson LLP; Daniel J. McGrath

(57) ABSTRACT

Disclosed is a method of presenting a media file enabling a user to emulate musical content therein. The media file comprises a plurality of segments, each segment representing a demonstration of at least part of a musical phrase comprising one or more musical notes of a piece of music. The method comprises presenting a first segment of the plurality of segments for emulation by the user. The method further comprises subsequently presenting the first segment followed by a second segment of the plurality of segments for emulation by the user. The method further comprises subsequently presenting the previously presented segments followed by additional segments until all of the plurality of segments have been presented for emulation by the user.

14 Claims, 13 Drawing Sheets

(51) Int. Cl.
*G09B 5/06* (2006.01)
*G09B 15/04* (2006.01)
*G10G 7/00* (2006.01)
*G10H 1/00* (2006.01)

(52) U.S. Cl.
CPC ............ *G10G 7/00* (2013.01); *G10H 1/0008* (2013.01); *G10H 2210/061* (2013.01); *G10H 2210/375* (2013.01)

(56) References Cited

U.S. PATENT DOCUMENTS

| | | | | |
|---|---|---|---|---|
| 8,119,896 | B1* | 2/2012 | Smith | G09B 15/00 |
| | | | | 84/470 R |
| 8,847,053 | B2* | 9/2014 | Humphrey | G09B 5/065 |
| | | | | 84/649 |
| 9,311,824 | B2 | 4/2016 | Humphrey et al. | |
| 11,361,671 | B2* | 6/2022 | Humphrey | G06Q 50/00 |
| 2010/0162878 | A1 | 7/2010 | Lengeling et al. | |
| 2011/0112672 | A1* | 5/2011 | Brown | G11B 27/28 |
| | | | | 700/94 |
| 2023/0141326 | A1* | 5/2023 | Williams | G10G 1/00 |
| | | | | 84/649 |

OTHER PUBLICATIONS

Search Report of GB Application No. GB1820958.5 dated Jun. 11, 2020.

\* cited by examiner

SYSTEM AND METHOD FOR REUSABLE DIGITAL VIDEO TEMPLATES INCORPORATING CUMULATIVE SEQUENTIAL ITERATION TECHNIQUE IN MUSIC EDUCATION

CROSS REFERENCE TO RELATED APPLICATIONS

This is a national stage application filed under 37 U.S.C. 371 based on International Patent Application No. PCT/GB2019/053638, filed on Dec. 19, 2019 and entitled "SYSTEM AND METHOD FOR REUSABLE DIGITAL VIDEO TEMPLATES INCORPORATING CUMULATIVE SEQUENTIAL ITERATION TECHNIQUE IN MUSIC EDUCATION", which claims priority to United Kingdom Application No. 1820958.5, filed on Dec. 21, 2018, entitled "System and method for reusable digital video templates incorporating cumulative sequential iteration technique in music education", the contents of which are incorporated herein by reference in their entirety for all purposes.

TECHNICAL FIELD

The present invention relates to systems and methods for computer generated video and audio production/manufacturing and more particularly, but not exclusively, to a framework based upon a system of digital templates the creation of which enables the computer to generate an extensive series of interactive instructional video and audio data for the teaching of musical instruments and singing skills.

BACKGROUND

Music education and the act of learning to play a musical instrument or sing is a significant part of most if not all modern societies, and the music business in all of its forms is huge and a significant driver for young and older people to want to emulate their musical heroes and role models.

In order to reach a reasonable level of skill on a musical instrument (including the human voice), levels of motivation to practise must be maintained from the outset. Where repetitive practising of sequences of notes or sounds is required and the progress of the learner is slow, as is often the case, levels of motivation suffer a corresponding drop over time and a high percentage of learners will give up entirely.

It would therefore be advantageous to create an interactive instructional video which can be employed to teach a skill, firstly that of playing a musical instrument or singing, whereby the execution of errors which necessitate repeated correction strategies during learning by the end user, is reduced to an absolute minimum. Secondly, the same principles can also be applied to the teaching of reading music notation, or "sight reading".

The main goals during the learning of any new sequence of notes, chords or sounds may be considered as firstly, the attainment of an accurate reproduction of the required motor sequence (fingers/hands/limbs/breathing etc) in the shortest time possible and secondly, the ability to consistently reproduce an accurate performance of the same motor sequence necessary to produce those notes, chords or sounds.

Using video and audio data as a medium to teach people how to play a musical instrument or sing has increased greatly in popularity over the last few decades as people explore alternative models to teach themselves the necessary skills.

Such videos with audio data are currently widely available on platforms such as YouTube, and through a large number of websites, or other social media platforms and applications that provide instrumental or singing tuition wholly or partially through the medium of video.

These may now also include footage using the simultaneous depiction of multiple camera angles. It is also possible when playing the video through the use of a variety of currently available software, for the user to select a section of a video and cause it to repeat, or "loop" automatically until paused by the user. The user may also be able to adjust the speed of the video which serves to aid error reduction whilst learning.

The use of such currently available tuition videos or software regularly and habitually necessitates the end user undergoing a process of physically pausing, replaying, setting start/end points for looping and making repeated attempts to copy or mimic parts, or all, of the performance on a video.

Also in the prior art are other software applications, which may use either MIDI (musical instrument digital interface), and/or the use of pitch and timing recognition systems that are capable of giving visual feedback to the user in real time whilst the user plays along with a section of music. Applications such as Yousician (US 20140041511A1) and others implement methods which undoubtedly address the object of increasing the motivation of the user to practise, but any related success in this object through the use of such applications is most likely to have been achieved primarily as a result of the heavily relied upon addictive aspect of gamification used in such systems of learning. Whilst motivation to practise is increased with such solutions, there is inevitably a huge repetition of error whilst the user repeatedly plays along with sections of the same music, gradually seeking to reduce the number of errors. Indeed it is the identification of such errors, and the resulting scoring of how badly/well the user performs when using such a system which is its key attraction. This makes for a far less efficient strategy for skill acquisition than with that of the present invention.

It is one of the aims of the present invention to mitigate the problem of the user having to repeatedly pause and replay sections of the video, which inevitably results in a degree of learner error. Another significant aim of the present invention is to mitigate the occurrence and repetition of such learner error which results from attempting to play longer sequences of notes than are desirable as described above.

The present invention solves both of these problems by delivering a significantly quicker and more effective skill learning procedure, than through using the video materials or software applications currently available.

In doing so, a third aim of the present invention is addressed and solved in creating a means by which the end product instructional videos that solve the two problems stated above, can be manufactured as follows:

Using the present invention, the parsing of instructional material within a pre-recorded video file can be automated. Similarly, the reconstitution of the parsed instructional material can also be automated in a different form which will present, in a preferred exemplary embodiment, firstly a single note (or other sound), followed by an opportunity for the user to copy and repeat, then a first and second note, then a first, second and third note and so on, on each occasion interposed with the opportunity to copy and play along with the video (and/or audio).

A reference to explain the reasoning behind this process should first be made here to some of the prior art in terms of advances in neuropsychology, such as "errorless learning".

Errorless learning was an instructional design introduced by psychologist B. F. Skinner in the 1930s as part of his studies on what would make the most effective learning environment. Skinner said: "errors are not necessary for learning to occur. Errors are not a function of learning or vice versa nor are they blamed on the learner. Errors are a function of poor analysis of behaviour, a poorly designed shaping program, moving too fast from step to step in the program, and the lack of the prerequisite behaviour necessary for success in the program." In errorless learning, as each skill is taught, subjects are provided with a prompt or cue immediately following an instruction. The immediate prompt prevents any chance for incorrect responses.

Errorless learning can also be understood at a synaptic level, using the principle of Hebbian learning as described in Donald Hebb's book (1949) "The organization of behaviour". In his explanation for the adaptation of neurons in the brain during the learning process, he described a basic mechanism for synaptic plasticity. What is now referred to as "Spike-timing-dependent plasticity" (STDP) is:

"A biological process that adjusts the strength of connections between neurons in the brain." The process adjusts the connection strengths based on the relative timing of a particular neuron's output and input action potentials (or spikes) (see also: https://en.wikipedia.org/wiki/Action_potential). The STDP process partially explains the activity-dependent development of nervous systems, especially with regards to long-term potentiation (a strengthening of synapses) and long-term depression (a weakening of synapses).

Errorless learning has been found to be effective in helping memory-impaired people learn more effectively. The reason for the method's effectiveness is that, while those with sufficient memory function can more easily remember mistakes and learn from them, those with memory impairment may have difficulty remembering not only which methods work, but may strengthen incorrect responses over correct responses, such as via emotional stimuli. This strengthening of incorrect responses may also occur to a lesser degree with mainstream learners that have no memory impairment.

The principles of errorless learning as described here are applied in the format of the present invention, and serve to further enhance the application of the invention in terms of inclusivity to a wider variety of users. Users young and old, who may suffer from any of a number of conditions where the embedding of memory is impaired or lessened to any degree, are expected to be able to make use of, and benefit from the present invention. These principles are lacking in currently offered solutions found within the prior art such as those described above.

Significantly, neither is there available such a pre-constructed digital template or templates that could be used with proprietary video editing software and which would enable a user to create a finished product such as that described herein by simply importing their own video file into the editing software and allowing the digital template itself to be used as a vehicle through which to create the end product video, as described herein.

It should be noted, that the general intended purpose of video editing software is to allow the creation of an individual and unique video, and each and every finished video that is produced would have necessitated a different 'edit' or editing process. This is not the case with the present invention as described herein.

SUMMARY

According to a first aspect of the invention there is provided a method of presenting a media file enabling a user to emulate musical content therein, wherein the media file comprises a plurality of segments, each segment representing a demonstration of at least part of a musical phrase comprising one or more musical notes of a piece of music. The method comprises presenting a first segment of the plurality of segments for emulation by the user. The method further comprises subsequently presenting the first segment followed by a second segment of the plurality of segments for emulation by the user. The method further comprises subsequently presenting the previously presented segments followed by additional segments until all of the plurality of segments have been presented for emulation by the user.

Optionally the media file comprises an audio representation of the piece of music.

Optionally the media file comprises a first video representation of the piece of music.

Optionally the media file comprises a further video representation of the piece of music shown from a different angle than the first video representation.

Optionally the media file comprises text and/or still images relating to performance of the piece of music.

Optionally the media file comprises metadata defining a tempo at which at least one of the plurality of segments is to be presented.

Optionally a tempo at which at least one of the plurality of segments is presented is controllable by the user.

Optionally presenting at least one of the plurality of segments further comprises simultaneously presenting an audio metronome at a corresponding tempo to the at least one segment.

Optionally presenting at least one of the plurality of segments further comprises simultaneously presenting an audio backing track at a corresponding tempo to the at least one segment.

According to a second aspect of the invention there is provided a method of generating an output media file from an input media file, the output media file enabling a user to emulate musical content therein, wherein the input media file comprises an unedited demonstration of a piece of music, the method comprises segmenting the input media file into a plurality of segments using a plurality of predetermined time intervals specified in a template, each segment representing at least part of a musical phrase comprising one or more musical notes of the piece of music. The method further comprises combining the plurality of segments in a predetermined order specified in the template to generate the output media file.

Optionally the template is selected from a plurality of templates based on the musical rhythm of the piece of music.

Optionally the time intervals are tuneable to account for variations in the demonstration.

Optionally the time intervals are tuneable to account for musical notes that are played ahead of time in the demonstration.

Optionally the output media file comprises a first segment of the plurality of segments for emulation by the user. The output media file further comprises the first segment followed by a second segment of the plurality of segments for emulation by the user. The output media file further comprises the previously presented segments followed by additional segments until all of the plurality of segments have been included in the output media file.

According to a third aspect of the invention there is provided a computer program comprising instructions which, when the program is executed by a computer, cause the computer to carry out the steps of the first or second aspect.

Certain embodiments of the invention provide a method whereby a demonstration of a piece of music is presented to a user for them to repeat/emulate. The demonstration is presented in an iterative manner whereby each time it is played it includes an additional note or notes (a segment) of the piece of music, as discussed in more detail herein. This process is repeated until the entire piece of music has been played to the user.

Certain embodiments of the invention can present a piece of music to a user in a manner that makes it easier for them to emulate and/or learn musical content therein.

Certain embodiments of the invention provide a method whereby an output media file is generated based on an input media file. The input media file includes an unedited demonstration of a piece of music, for example a recording of a person playing a piece of music. The output media file is generated using a template to i) split the demonstration into segments, each segment including one or more notes, and ii) combine the segments into a predetermined order. The predetermined order is such that via the output media file a piece of music can be presented (demonstration for emulation by a user) in an iterative manner as discussed herein.

Certain embodiments of the invention can substantially or entirely automate the process of converting an unedited demonstration of a piece of music into a format suitable for presenting to a student for effectively learning the piece of music.

Certain embodiments of the invention relate to systems and methods within proprietary video editing software, for the construction of digital templates. These templates are used in turn to generate or manufacture a series of differing end product videos or audio tracks by means of a simple importing and immediate rendering process which uses new or replacement short unedited video/audio files as raw material to repopulate the templates. These end product interactive instructional videos are operable with minimal end user input with regard to the pausing and replaying of sections.

Still more particularly, both the templates and the resulting end product videos are based upon a principle of sequentially cumulative note or sound iterations, and are used within the field of computer assisted musical skill acquisition as part of a learning programme which also includes a degree of low level gamification.

Certain embodiments can mitigate the problems and disadvantages relating to current solutions within the prior art, namely to teach the skills needed to play a musical instrument or to sing whereby the execution of errors which would necessitate repeated correction strategies during learning by the end user or learner, is significantly reduced. As a result of the strategies embodied within the invention, the additional object of maintaining or enhancing the motivation of the learner to continue learning is achieved.

The solutions presented combine aspects of the three separate fields of neuropsychology, musical pedagogy and computer assisted digital video editing techniques. The problems addressed by the present invention have long existed, as has the information and technology drawn from the state of the art within these three fields, yet until now the inventive steps required to successfully combine aspects from these three fields have not been taken in order to present solutions in the form of an entirely new resource as embodied herein by the present invention.

Various aspects and features of the invention are defined in the claims.

BRIEF DESCRIPTION OF THE DRAWINGS

Embodiments of the present invention will now be described by way of example only with reference to the accompanying drawings and where like parts are provided with corresponding reference numerals and in which:

More particularly, FIGS. 6 to 8 show close ups of an audio track within the GUI which illustrates two digital solutions to the quality control of timing errors as described herein.

More particularly, FIG. 9 shows a close up of both video and stereo audio tracks representing the final section of the template as described herein.

DETAILED DESCRIPTION

Figure 1:
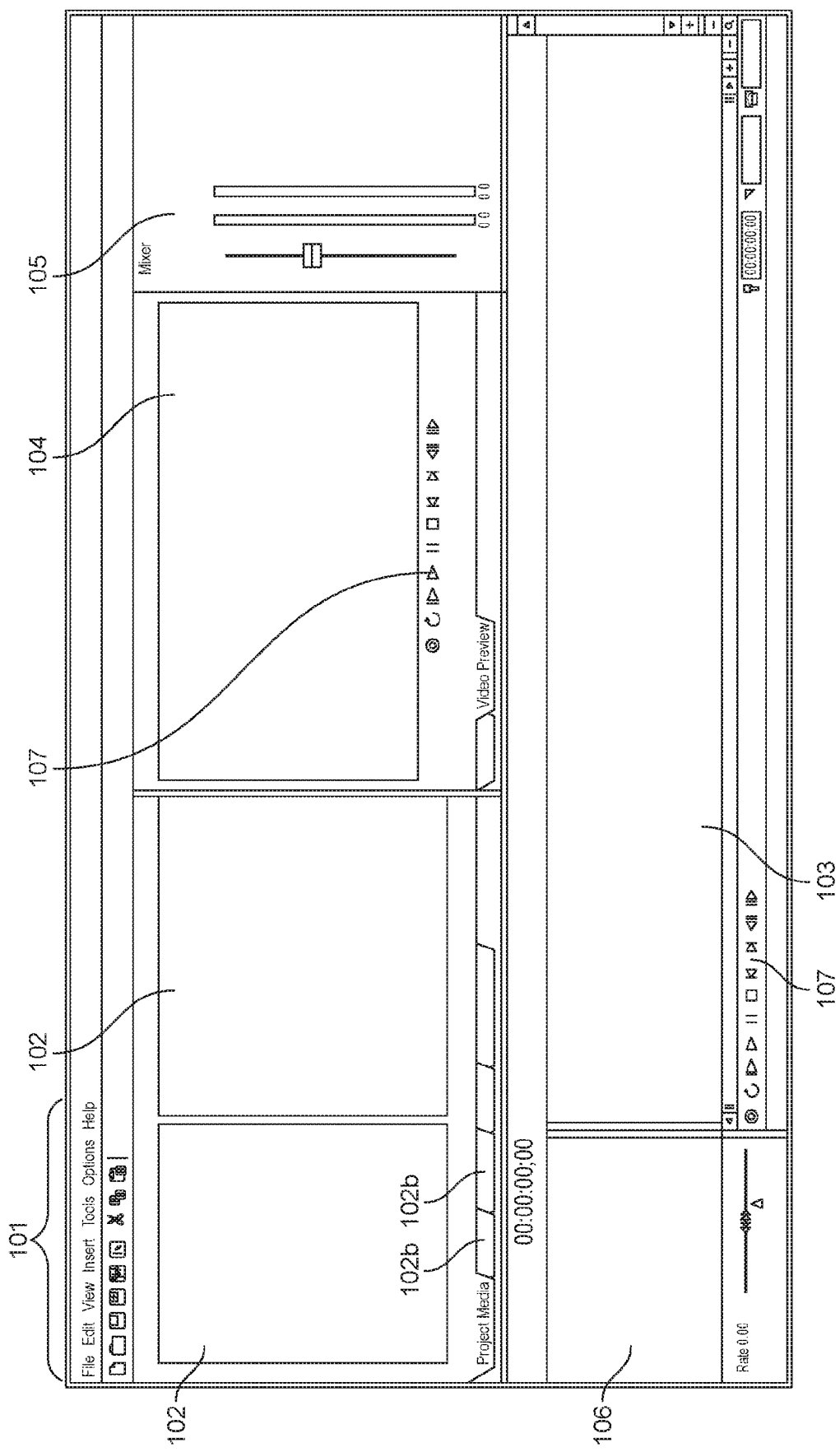
FIG. 1 provides a diagram of a typical graphical user interface (GUI) that might be used with current or recent video editing software applications depicting the GUI prior to the importing of any video, audio or other media footage.

Disclosed is an instructional or educational product in the form of a digital multimedia file which comprises video and audio information of the playing of a musical instrument or the human singing voice. The information is presented in a way that is not used currently in digital learning programmes within the field of computer assisted musical instruction videos and can be described as follows:

In a preferred embodiment, a musical phrase to be learned is presented by means of a digital video file in which is demonstrated, the first note being played (or sung), then by showing a repeat during which the end user or learner has one or more opportunities, to copy and play along with the video. This is followed by a demonstration of the first two notes of the phrase, and again one or more opportunities to copy and play along, followed by the first three notes with repeat/s then the first four notes and so on until the completion of the designated phrase to be learned. The number of notes to be added in any one section of the video, the number of repeats and parameters which include for example, the number of different camera angles shown simultaneously, may vary in other preferred embodiments.

Also disclosed is a system or method involving the creation of re-usable digital templates which enable the automatic cutting and editing of multimedia files containing time varying content on a non-transitory computer readable storage medium which in turn results in the production of an entirely new multimedia file.

The new multimedia file that is produced contains interactive instructional information that can be presented to a user in such a way that is more effective with regard to skill acquisition and learning than that which currently exists elsewhere in the field of musical training, instruction or pedagogy.

Additionally, when using the term "digital template" (or template) what is referred to herein should be considered as somewhat different from the commonly available templates which are used with proprietary video editing software. The latter are likely to contain pre-recorded material (images, text, effects etc.) that is designed to be customised or further edited by the user. In contrast, each exemplary digital template as referred to herein may be better described as a unique digital framework, the purpose of which is to be completely re-populated by new and different video or audio files as required to produce an end product multimedia file, and where said digital template is created as follows:

An original video file (with audio) which has already been pre-recorded at a specific performance speed or tempo required for said digital template is imported into the proprietary editing software. In a preferred embodiment, the speed or tempo may be increased or decreased afterwards from within the proprietary editing software used to create said digital template. In another preferred embodiment the speed may be varied through interaction by the end user when playing back the end product video.

Optionally, an audio file without video may be used in a preferred embodiment.

In a preferred embodiment, the first part of the said video file (or audio file) will be of a specific and uniform length of time which is set before creating said digital template during the filming/recording of the video/audio. This length of time must be identical for any other alternative source videos that are to be used afterwards in order to produce further end product videos from the same preferred embodiment of said digital template.

In the illustrative exemplary embodiment, the source video is a short video (with audio) of approximately 13 to 14 seconds duration which commences with a short but defined period of silence. In the illustrative exemplary embodiment this is a period of 1 second but this period may be varied to a greater or lesser degree according to the expected needs or demands of the intended end user.

In a preferred embodiment this short period of silence is followed by an audio count-in of any number of beats depending upon the musical time signature being used. Most commonly, but not exclusively, this will be 3 or 4 beats. The count-in of the illustrative exemplary embodiment occurs at 1 second intervals, and count-ins may use a percussive sound such as a handclap or similar or other sound, to represent each beat of the count-in. In a preferred embodiment, the count-ins may also have a simultaneously narrated vocal count in added to the percussive or other sounds. In another preferred embodiment text may be added or superimposed onto the video, corresponding to the beat number as each beat is heard, for example 1, 2, 3, 4. The count-in serves as an audio and/or visual cue preparing the end user for what is to follow.

In a preferred embodiment the percussive sound used for the count in may continue further into the video being made where it serves as a continual metronome which is referred to as a "click track" to further assist the end user to play in time.

In the case of the illustrative exemplary embodiment what ultimately follows are 2 notes of equal duration (each lasting for 1 beat=1 second), two shorter notes of 0.5 seconds, and 1 final note of 1 second in duration being heard and shown played. In the illustrative exemplary embodiment notes are played on a guitar at a speed or tempo of 60 beats per minute (1 beat per second). The use of different note lengths have been used to illustrate the fact that each digital rhythmic template will differ in its construction, which can be seen with reference to the drawings, and that a large number of templates will ultimately be required to cover the huge variety of rhythmic variation that may occur even within two bars of music. The illustrative exemplary embodiment depicts a musical phrase comprising only a single bar of music.

In another preferred embodiment the instrument shown and/or used could be any other musical instrument, including un-tuned percussion, such as a drum kit, and in yet another preferred embodiment the human singing voice with a video or audio recording of the person singing could be used and/or shown.

In a preferred embodiment where the instrument is not tuned, such as a drum or drum kit, then the sounds herein described for other preferred embodiments as 'notes', will be replaced by any of the wide variety of percussive sounds that may be available in such a non-tuned instrument.

In a preferred embodiment, the speed or tempo could be less, or greater than 60 beats per minute.

In the illustrative exemplary embodiment the count-in is followed by the demonstration of the first note being played, including any or all differing camera angle views to be included in the video, and is followed by a purposely edited short break or pause of one second in duration. In another preferred embodiment, this pause or break could vary in length, and be less or more than one second.

In a preferred embodiment, during the pauses that occur between the images of the preceding note or notes being played or sung, such images may be 'frozen', and shown as still images for the duration of the pause. In another preferred embodiment, a blank screen of any colour, or a different image with or without text may be shown during these pauses.

In a preferred embodiment, instructional narration may be added during the pauses and/or during the playing of other sections of the video track.

In a preferred embodiment, the video images may be faded or removed altogether leaving only the audio track to play along to in order to increase the level of challenge and further embed motor skills in the long term memory of the user.

In a preferred embodiment, the notes being shown and heard played may have an audio accompaniment or backing track added, which may be played by any combination of other instruments, tuned or un-tuned, or using any combination of real instrumental and/or vocal sounds, or computer synthesized sounds.

In the illustrative exemplary embodiment, the sequence of the count-in followed by the first note is followed by a short pause after which the sequence is reiterated. This iteration as described for the illustrative exemplary embodiment is followed by another similar pause.

In a preferred embodiment the volume (loudness) of the note being played in this subsequent iteration may be reduced or increased to a greater or lesser degree. In a preferred embodiment there may also be a reduction or increase in the volume of any accompaniment or backing track, or the volume may remain the same as in the previous iteration.

In another preferred embodiment, the sound of the note or notes being played in a particular iteration may be removed altogether.

In a preferred embodiment which uses solely an audio track, the volume of the accompaniment may also be altered, or its sound removed altogether. The intention and instruction for the end user in all embodiments of this invention, is that the end user plays or sings the note or notes they have seen or heard previously demonstrated, in time, along with the video and/or audio as presented. This can be achieved through the use of an audio visual system which may comprise: a processor, an input device operable to receive audio and video data, video and audio engines able to transform said data into output data, and a database operable to store audiovisual files where all parts of said audio visual system are embodied in non-transitory computer readable storage media.

The next step in the creation of the template as depicted in the illustrative exemplary embodiment involves the same process as previously described, but with the addition of the second note or sound of the musical phrase to be learned. The end user will now see and hear the count in, followed by the first two notes of the musical phrase played in time. This will be followed by a pause as previously described, and then the next iteration so that as before, the end user may play or sing along with the video or audio track, this time playing both first and second notes. A pause will follow again, and the process will be repeated but now with the first three notes. It will be noted that the third note is shorter in duration than the previous two. This will continue until the full complement of notes in a particular preferred embodiment is reached.

In the illustrative exemplary embodiment, and in some other embodiments, the process may best be described as being one of sequentially cumulative iterations with respect to the fact that successive demonstrative iterations will contain one note (or segment) more than the previous iteration. Each combination of notes will be repeated at least once, to provide the opportunity for the user to play on their own instrument (or voice) what they have previously seen and/or heard.

In another preferred embodiment, there may be a plurality of notes or sounds that are added in any particular iteration, where it is considered that more skilled or advanced end users may reasonably achieve successful performances upon the instrument, or voice, with such an incremental increase in the number of notes or sounds added.

In a preferred embodiment, the number of successive iterations of any section of the video or audio track may be greater than one.

In a preferred embodiment, the source video or audio track, the template, and the end product video or audio track may also include a plurality of note durations.

In a preferred embodiment, there may be a plurality of differing combinations of note values (durations). For example, in place of any particular note lasting one beat (one second in the illustrative exemplary embodiment), the note may last a half, quarter, or three quarters of a beat (0.5, 0.25, or 0.75 seconds if also considered at the speed of the illustrative exemplary embodiment), or any other common musical subdivision (thirds or sixths of a beat for example). Similarly, a note may last for one and a quarter, one and a half, one and three quarters, two, two and a quarter, two and a half beats etc., up to an estimated maximum duration of 8 beats when considered at the musical time signature of 4/4 (four beats to each bar).

In a preferred embodiment the combinations of musical notes or sounds may also contain pauses, (known as 'rests' in musical terminology). Such pauses or rests are not the same as those pauses already described as being purposely inserted between successive iterations when creating or editing the template in a preferred embodiment. Rather they are an integral part of the musical phrase being broken down and then reconstituted during the creation of the digital template, and subsequent creation of the end product video or audio track. In a preferred embodiment there may also be a plurality of values or durations of such musical pauses or rests. This plurality would encompass the same degree of variation as for that within the description herein of the musical notes or sounds that may have been used.

In a preferred embodiment, any or all of the notes or sounds may be replaced or substituted by chords, which are instances of more than one note being sounded simultaneously. These may be used in a preferred embodiment when creating digital templates and end product videos for instruments that are capable of playing such chords. Such instruments may include a guitar, a piano or other keyboard instrument. This list is not exclusive and may include any other instrument that has the capacity to play more than one note (or one sound) simultaneously.

In a preferred embodiment, the total number of notes being shown played or heard during a particular iteration may begin to challenge the likelihood of success of the end user in their attempts to copy such a number of notes. In such a preferred embodiment, an increase in the number of identical iterations at a given point, and beyond this point, may be implemented to help to increase the chances of success of the end user when their levels of concentration begin to drop. This will allow an even more thorough embedding of audio, visual and kinaesthetic memory related skills, whilst still challenging the user to maintain the focus necessary for a successful performance.

Also disclosed is, with reference to the illustrative exemplary embodiment: the digital template (this may be referred to as a "project" during its construction within the language commonly used in proprietary editing software) which was created from the original source video file can be saved in a preferred file format of the editing software. Each digital template can then be used as a means by which to create any number of different end product videos as follows:

Upon closing and reopening this template or project the software may search for the original video file used in its original location, and/or under its original file name, having been programmed to do so.

A variety of options are then available, depending upon the software being used. In some cases an option is available to simply replace the source video file used to create the template with another different video file. In other cases the software may default to searching for the original file being used, and not allow a replacement file. In such cases it may be possible to rename the replacement video file with the same name as that of the original file, but store it in a different location. The software may then accept this file if it is of the same name and file type as that of the original.

This is similar to a process already well known within the field of digital video editing as "proxy editing". The usual purpose of editing by proxy involves the use of a highly compressed low resolution video file to speed up the editing process within the software when the central processing unit of the computer is not sufficiently powerful. When editing is completed the proxy files may then be replaced with the intended high resolution file immediately prior to the rendering and exporting process.

The differences in purpose between the above description for proxy editing and that of the method used in the present invention are twofold:

Firstly, in proxy editing as described above, the content or subject matter of the replacement video file is the same as its proxy file. In the present invention however, the content is intentionally different, which is significant and advantageous in that it facilitates the reusability of the digital templates as described herein.

Secondly, the purpose is not specifically to speed up the editing process by using a highly compressed low resolution video file, such that in a preferred embodiment the resolution of the replacement file may be the same as that of the original proxy file used in editing whilst constructing a template.

In any case, having edited the original file to create a template, the new or replacement source video file (having been previously recorded) can then be imported. This replacement may contain content which has entirely different notes with different pitches or percussive sounds but importantly, with the same rhythmic phrasing or combination of note durations, where the musical phrase may be played on the same instrument, or on a different instrument or singing voice.

The template can then be used as a vehicle of manufacture by replication to recreate the format of the first video automatically, and a new end product video can be easily produced by the simple process of video (or audio) rendering. This is possible without any need to repeat the detailed and time consuming editing process (namely, that used to create the digital template itself) as contained within the description herein for the illustrative exemplary embodiment and other preferred embodiments.

Video rendering is a commonplace and widely used process whereby a computer renders graphics and generates a full motion video playback version that can be viewed by the end user in real time. Where solely an audio track is used, similar treatment will generate a similar end product audio track, without the video or graphic detail.

In compiling a library of templates using the process described herein, there will be no need to carry out the further and lengthy process of separately editing each new individual source video before rendering to create the end product video that is to be viewed by the end user. A digital template which has been created as described in the illustrative exemplary embodiment will eliminate the need to make time consuming edits of each new source video, thus allowing rapid reproduction of an extremely large number of end product videos in a very short space of time.

Also disclosed is a further unique system or method to be used in the compilation of a library of re-usable digital templates which is significant in minimising the amount of work initially required to compile such a library of what would amount to an enormous number of different rhythmic combinations or variations for even as little as two bars of music.

This method involves firstly the creation of an unspecified number of digital templates which would encompass an arbitrarily required number of variations in rhythmic content including the subdivisions of note durations stated herein which would cover one bar of music in all of the differing musical time signatures in common use. As the total number of templates created is extended to cover durations greater than around one bar of music, then this total number of templates (variations) required will increase exponentially with every additional note or beat.

It should be noted that the referencing herein to durations of one bar of music in digital template construction has been adopted simply as the most suitable subdivision of time for the purposes of clarity of explanation and in reference to an illustrative exemplary embodiment. In practice it will be the case that where one bar of music is used which contains a greater than arbitrarily desirable number of notes, then a template may be constructed using any of a plurality of subdivisions of a bar which lends itself to minimising the amount of overall time spent in the compilation of a suitably extensive library of templates.

The problem of an exponentially increasing number of required templates has been addressed as follows:

For every template that is created for the first bar of music (or fraction of a bar as described above), a second template can be created to cater for an identical rhythmic content, but where that content now forms the basis for a template for the second bar of music. In doing so, the total number of such templates required to cover rhythmic variations in the second bar of music will be exactly the same as the number required for the first bar alone, therefore the total number of templates required to cover all reasonable rhythmic variations for two bars of music is simply double that of those required for one bar of music.

Using a process commonly used in video editing, called "nesting", the second bar of music can be saved as a separate template, using the preferred file type of the editing software used. When processing a new video file two bars in length through two separate templates that have already been created, the method as described herein is employed for both first and second bar templates. Following this the resulting second bar template (with it's now "new content") can simply be imported into the timeline of the new first bar template before rendering to produce the completed two bar end product video ready for the end user.

This method will reduce enormously the total number of templates required in the compilation of a library of reusable templates.

One aim in compiling a suitably extensive library of reusable digital templates as described herein is the application of knowledge from the prior art such as that contained in some of the most recent research findings on median student engagement with educational videos. In a guide published in 2015 (Brame, C. J. (2015). Effective educational videos. Retrieved 30 Jun. 2018 from http://cft.vanderbilt.edu/guides-sub-pages/effective-educational-videos/ .), it is documented that results from 6.9 million video watching sessions (Guo and colleagues 2014) indicate that video length is by far the most significant factor in student engagement time. Engagement time is the length of time spent watching the video (a standard metric used by providers such as Youtube). The median engagement time for videos less than 6 minutes in length was close to 100%, yet as this rises to between 9 and 12 minutes, the engagement time drops significantly to around 50%.

To summarise, of those end product videos of the present invention which are to be aimed primarily at beginners to intermediate learners, they should not be longer than around 6 minutes. A smaller number of templates may be produced to provide videos which go beyond 6 minutes, but these are intended for the more advanced learner only.

Also disclosed is the inclusion in a preferred exemplary embodiment within the proposed learning programmes intended for the end user, of longer sections of the musical pieces being used. For example, after having practised with a number of two bar sections of music using videos as described herein, it will be desirable for the user to apply the skills learned to longer sections of music. To this end, a smaller number of videos will be provided to the end user of sections of music that may be e.g., 4, 6, 8 or more bars in length. These videos can be constructed in a similar manner to that described elsewhere herein, but by substituting a short increment such as that of a single note with that of a considerably longer increment, namely that of an entire musical phrase as created by a particular digital template.

Also disclosed is the solution to a technical problem which may be encountered whilst constructing the templates. This addresses as follows an issue of quality control that may occur when using replacement source videos with an existing template.

During the initial recording of any video, the musician performing or playing the sequence of notes (including other sounds or chords) may play some of these slightly out of time. In the event that these notes are only very slightly later than they should have been sounded, there are no significant issues. In contrast, where a note is played very slightly early, or ahead of where it should have sounded, then the "head" of the note (the very first part to be audible) may appear and be heard at the end of the previous edited segment within the digital template. Upon processing such a video file through a previously made template, this would cause the end user to hear a short but significantly audible fraction of a note or sound which may prove irritating or distracting. Where the timing is out by a significant degree, then of course the musician would simply be recorded again to correct any errors before the resulting video file could be processed through a template.

Where the discrepancy in timing is very small however, then this addresses the problem with two applied solutions as follows:

Firstly, every separate section of the template is shortened at the end very slightly. So for example, where a first note should have had a duration of one second, the very last 0.05 seconds may be cut (the duration of 0.05 seconds is arbitrary and for the purpose of explanation only). The second note which may have begun at a point 0.05 seconds too early, will of course be heard when the next segment of the template is created, as that segment will have been edited to play from the start of the first note to the end of the second note without a break in between, as described in the illustrated exemplary embodiment.

To further mitigate the effect of any videos that slip through quality control, the audio track accompanying the video will be edited so that the very last few hundredths of a second are faded out (reduced in volume) sharply. The head of any note that is sufficiently out of time so as not to be caught by the former editing strategy will have its volume reduced to a such a low level so as to be sufficiently unobtrusive when processed through the latter solution.

Also disclosed is, in a preferred embodiment a means by which to teach the sight reading of music may be added to digital templates during the editing process thus allowing for further preferred embodiments of both digital templates and end product videos as described above.

An additional library of reusable digital templates can be created. These will include musical notation sited within the video and running synchronously with the notes being played and described as follows:

A video file of the musical notation that corresponds to the video of the musical phrase being played can easily be created and exported by using for example, proprietary music notation software such as Sibelius®.

This additional video file comprising musical notation can be added to a previously made rhythmic template and edited in a similar fashion to that as described above.

When a new musical phrase comprising different note pitches is desired to be processed through such a digital template, it will be simply a matter of replacing both the video file of the performance on the instrument, and also replacing the additional video file of the music notation showing the different pitches of the new musical phrase. The said digital template can then be easily rendered into an end product video.

So in addition to showing a video of the notes being played on a particular instrument by a musician, there will be musical notation for the end user to follow, suitably positioned so as not to overly obscure images of the instrument being played. This musical notation will be sequentially incremental in a manner which corresponds exactly to the sounds and images of the notes being played.

This allows the option to develop, a further library of both templates and end product videos through which can be shown both the performance of, and musical notation for a wide variety of musical phrases.

In this way, a moving video showing the notation synchronised with the notes being played upon the instrument being shown can be delivered where the notation is depicted within a window of the video as described herein, or as a side by side split screen effect or similar. The notation may be depicted showing a cursor or similar indicating the particular note being played in real time at any given point in the video.

As described herein, the media file of the musical notation can be used in situ when creating the template within proprietary video editing software in exactly the same way as described for that of the illustrated exemplary embodiment.

The speed or tempo of any sections of a digital template can be increased using a technique well known in digital video editing referred to as time-stretching. Time-stretching will speed up or slow down both audio and video tracks but without any change in pitch of the audio track. For any sections of the template that have been time-stretched, the same sections of a new or replacement video being processed through the template will be subject to the same changes in speed at the same points. An increase in tempo may be usefully applied in particular, but not exclusively, to the last repeated section of a template which covers the entire musical phrase being used, and will serve to enhance both the interest and focus of the end user through an alternative aspect of challenge whilst simultaneously further embedding the muscle memory already acquired in playing the phrase first at a lower tempo. Performing the increase in tempo from within the video itself, further replicates the way a good teacher would deliver a lesson in incrementally teaching additional notes and then slightly increasing the tempo only when the phrase has been mastered. The emphasis should always be placed upon accuracy before speed. If the end user knows that an increase in tempo is going to be introduced at some point, then they will be less likely to want to increase the tempo themselves sooner than is necessary. This may serve to temper natural human impatience and steer the end user towards the best possible results with regard to their overall speed of learning with the minimum number of errors, which again is best practice in the field of musical pedagogy.

The end product videos will be delivered through the development of an internet based learning programme using a series of levels corresponding to technical difficulty, tempo etc., in much the same way as in the construction of already established graded instrumental exams. It will be possible to take the musical pieces used on any instrument for any graded exams and break down then process them through the use of the relevant templates into a series of end product videos as described herein.

The end product video tuition files may be accessed by the end user through any of a variety of devices comprising desktop/laptop computers, ipads, android tablets, iphones, android phones, internet enabled TVs or any similar computer assisted devices. Access will be primarily by means of a website incorporating an embedded media player that is capable of allowing users to fine control the speed of video playback where desired. Alternatively users may prefer to play the videos using their own software applications to vary the speed of playback if so desired.

In certain examples, this will allow an individual to interact and so customise their experience if desired, and thus cater ultimately for the widest possible range of both user ability and user choice at any given stage of their development or progress. Target speeds or tempi will be suggested to the user before moving on to the next video, or to the next level of difficulty. Learning programmes grouping together musical pieces according to their degree of difficulty will be employed to guide the learner in the most effective route of skill acquisition, but allowing user choice in the level of difficulty to attempt.

Any or all of the systems, methods and processes described herein may be likewise applied to areas outside of the sphere of music education alone. For example, the teaching of languages, which are inherently rhythmic in nature, may benefit from the same treatment as described herein. Digital video templates of a similar nature using the principle of sequentially cumulative iterations may be created and used to depict time varying content of speech, whereby words, phrases and sentences are used in place of notes or bars of music. Other activities may include sporting techniques or any similar learning programmes which would benefit from an incrementally sequential repetition that can be broken down into a task/time scale and displayed through the medium of video after having been reconstituted using the system of digital templates as described herein.

FIG. 1 shows a diagram of a typical Graphical User Interface (GUI) of any of a variety of proprietary editing software for use with multimedia files such as video, audio, text files and some special effects. It is important to note that each particular window, tab, or illustrated controls may vary in size and position depending upon the proprietary video editing software being used and the preferences of the person using the software.

A typical menu 101 provides a number of drop down sub-menus enabling access to a variety of operations typical of proprietary editing software, such as opening, closing, saving files, editing files, rendering files, adding a variety of special effects etc.

Recent and current proprietary software commonly has the capacity to move, resize, or remove from view altogether, any of the windows such as those illustrated in the example GUI (102 to 106).

102 are the project media windows which might show a collection of the various video or audio files when they have been imported into the software to be used in the project, in this case, the construction of a digital template. The blank tabs 1026 shown below the windows may be selected to reveal other windows which may contain text files, special effects etc.

103 is the timeline window where precise editing such as cutting, copying, moving, fading etc., may be executed in order to create a digital template (alternatively referred to as a project in instruction manuals of most software).

104 in the case of the illustrated exemplary embodiment, is the preview window where the person editing can view the video at any stage of the editing process as an extra means of quality control.

105 show the master volume faders controlling the overall volume of the audio tracks during editing.

106 shows a window in which individual controls for video and audio tracks displayed within the timeline (103) window may be situated.

107 are the standard icons used for basic controls such as start, stop, pause, record etc.

Creating a template within the video editing software in a preferred exemplary embodiment may be achieved by first making a video (or audio) recording of a short musical performance played (or sung) at a specific speed (musical tempo) as required for a particular template. The performance speed or tempo of the musical phrase may be any from a range of one beat per minute to greater than two hundred beats per minute. The recording is saved as a video file (with audio) or audio file, and is then imported into any of a variety of proprietary video (or audio) editing software as illustrated in FIG. 2.

Figure 2:
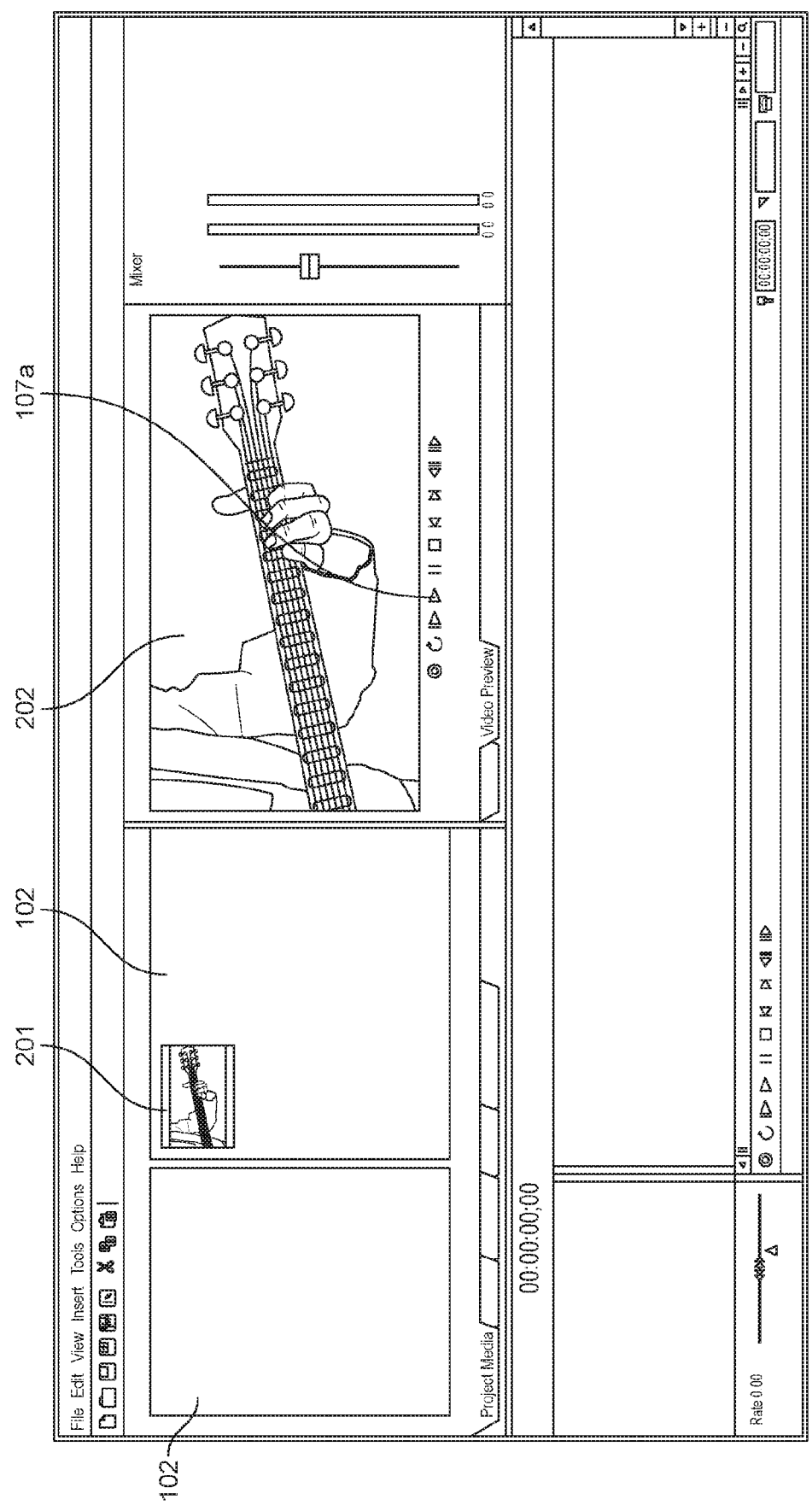
FIGS. 2 to 9 provide more detailed diagrams of all or parts of the same GUI at different stages of editing to produce the digital template for a preferred exemplary embodiment as described herein.

This video (the source video) is shown as a file (201) in FIG. 2 within the project media window. This file may also be viewed within the preview window (202).

Figure 3:
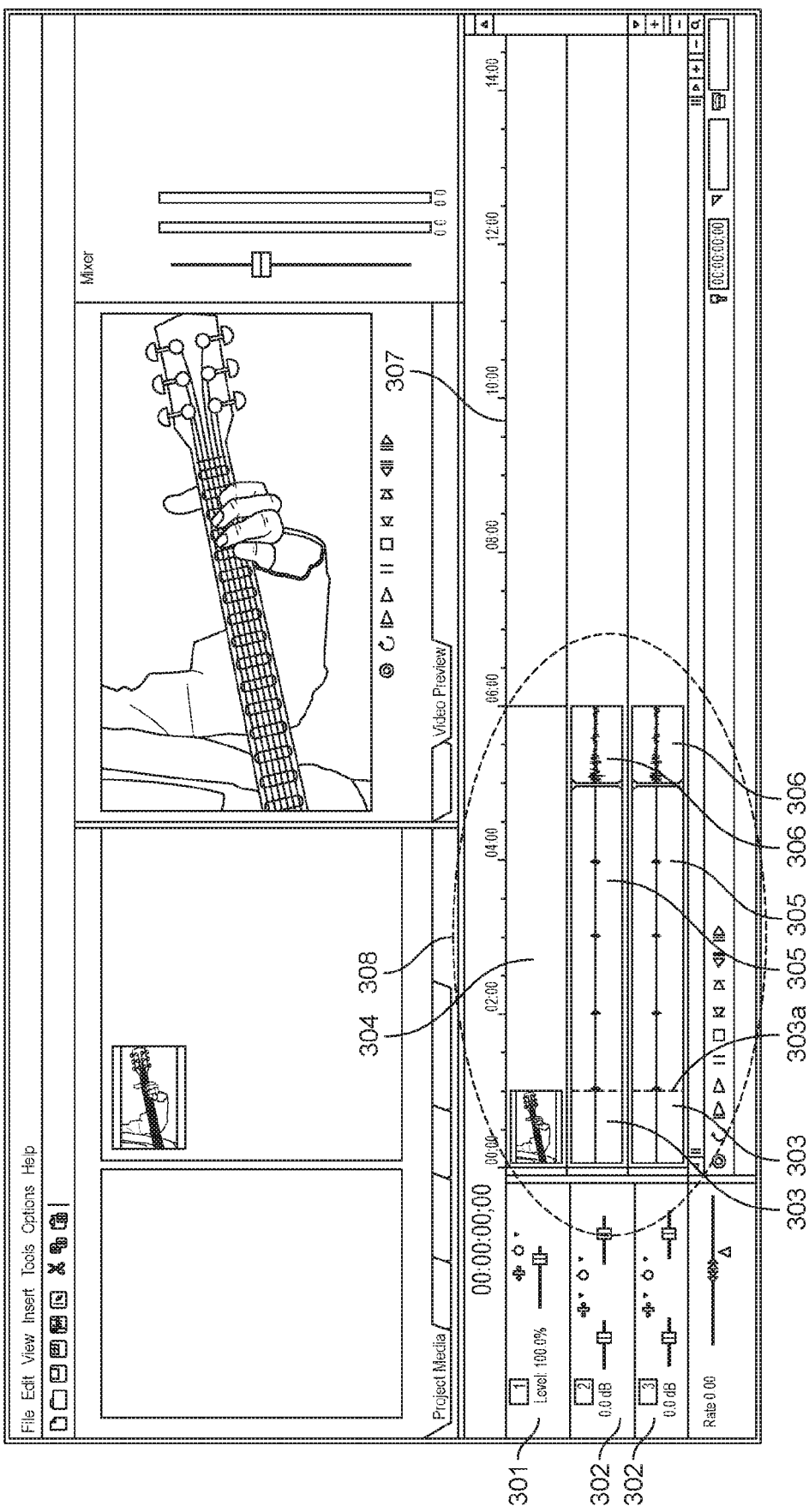

In the illustrated exemplary embodiment, the length of time from the beginning of the video to the first sound during actual filming/recording is that of one second. This is shown in FIG. 3 as the area up to the dotted line within the two audio tracks (303). This time must be identical to that used in any of the replacement videos that are to be processed through the same template in order for the end product video to be produced correctly as intended.

In a preferred exemplary embodiment, the uniformity of timing within the content of the first part of a source video (303) is set during the initial filming/recording of both the source video and importantly, any replacement videos that are to be processed. Executing recording in this manner removes the need for any additional editing and rendering with any new videos that are to be processed through a template.

Figure 10:
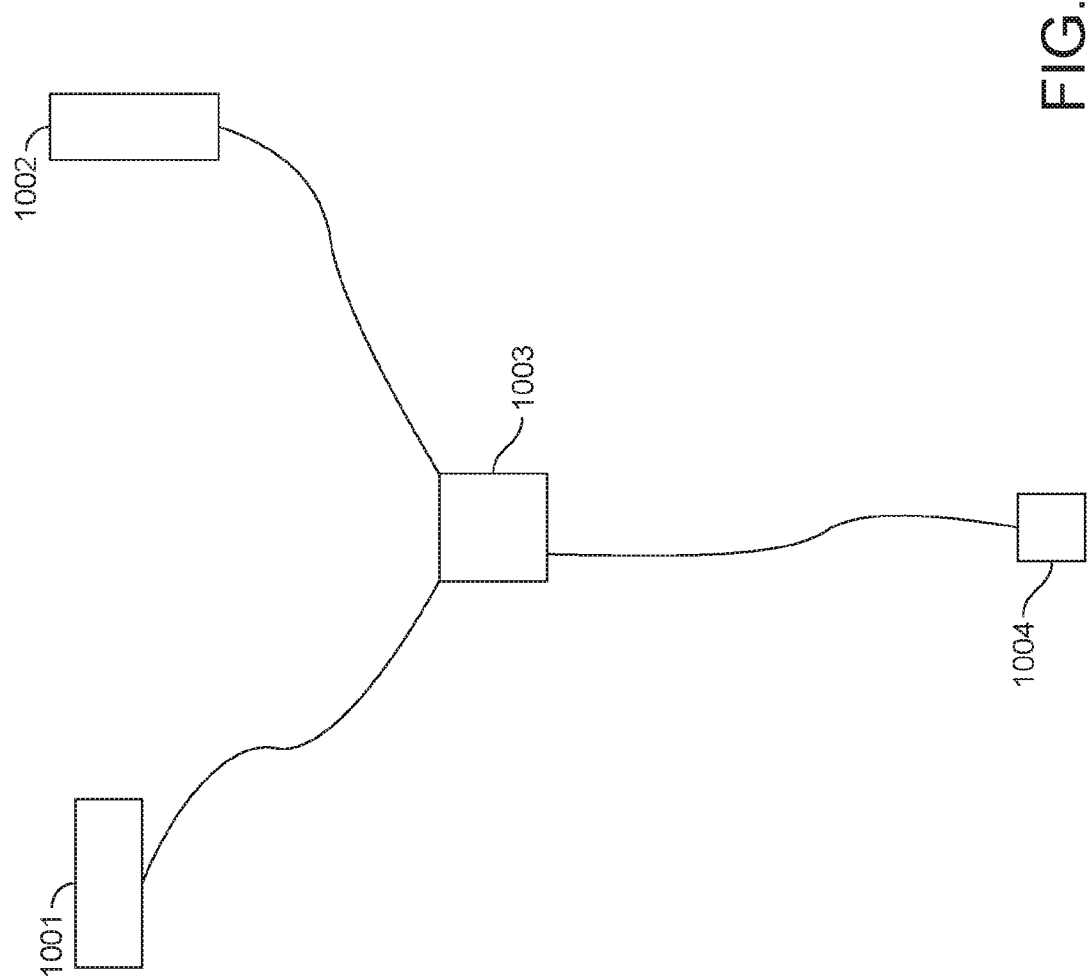
FIG. 10 shows a simple switching system used to maintain the uniformity in the first part of all videos in a preferred exemplary embodiment and as described herein.

In the illustrated exemplary embodiment this is achieved by a simple switching system shown in FIG. 10 (1003) which triggers a digital metronome (1001) to start at the same time as the video camera (1002). The musician or performer being recorded commences playing on a pre-chosen beat.

In a preferred exemplary embodiment the sound of the metronome may be recorded, shown as four small distortions of the horizontal line within the first part of the two audio tracks in FIG. 3 (305). In another preferred embodiment the sound of the metronome may be heard by the performer for timing purposes but not recorded. In either case the timing of the first part of the recording (as shown in the timeline: 303) shall be uniform and consistent with reference to a particular template being constructed or used.

In the illustrated exemplary embodiment FIG. 3 the period of silence is a period of 1 second (303) but this period may be varied to a greater or lesser degree according to the expected needs or demands of the end user.

In a preferred exemplary embodiment, the audio count-in (305) may be of any number of beats the number of which may (or may not) correspond to the musical time signature being used. Most commonly, but not exclusively, this will be 3 or 4 beats.

The metronome count-in as shown in the illustrated exemplary embodiment FIG. 3 (305) occurs at 1 second intervals, and count-ins may use a percussive sound such as a handclap or similar to represent each beat of the count-in. In a preferred exemplary embodiment the count-ins may also have a simultaneously narrated vocal count in added and may also have text added to the video corresponding to the beat number as each beat is heard i.e., 1, 2, 3, 4. The count-in (305) serves as an audio cue (and visual cue if text is used), preparing the end user for what is to follow. In another preferred embodiment the count-in may be omitted altogether.

Figure 9:
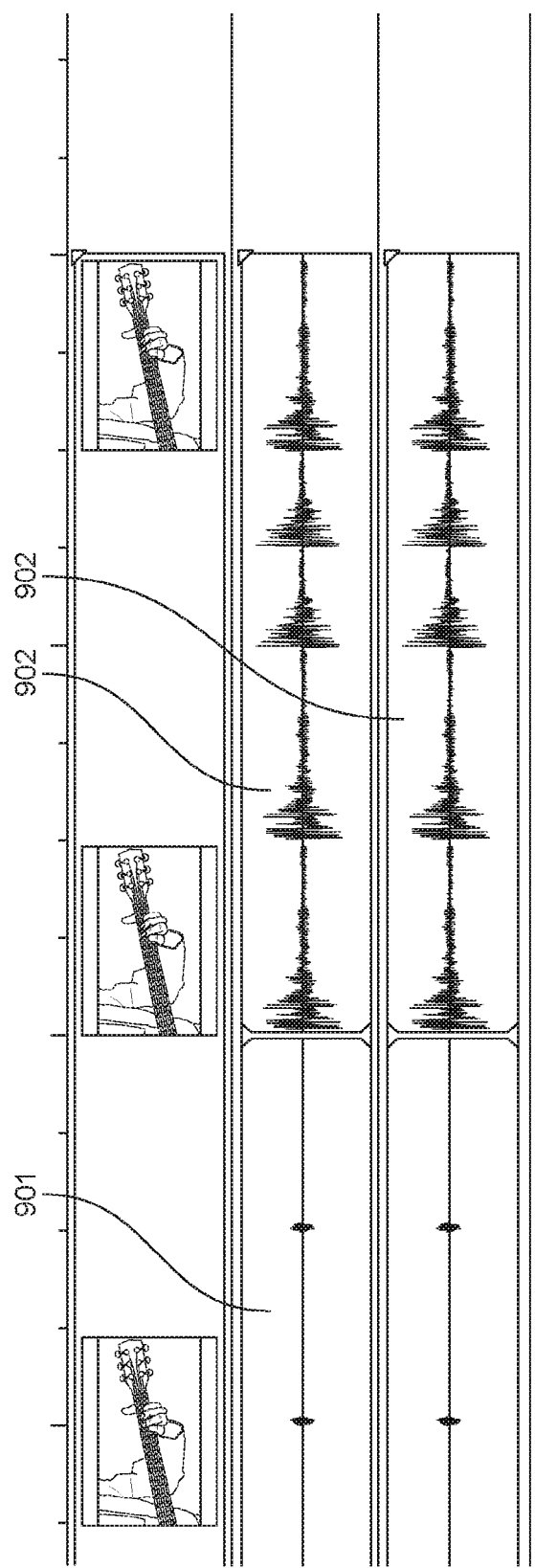

In the case of the illustrated exemplary embodiment, when opened within the timeline (103), the part of the video file shown in the project media window in FIG. 2 (201) which contains the musical phrase, will appear as shown in FIG. 9 (902).

The sound wave of the musical phrase as depicted in FIG. 9 (902) shows 2 notes of equal duration (crotchets—each lasting for 1 beat=1 second), two shorter notes of 0.5 seconds (quavers—half a beat each), and 1 final note (crotchet) of 1 second in duration. These can be both heard and are shown played in both the template and in the end product video.

The editing process in creating the template proceeds as follows:

The complete video file (201) is cut to appear as shown in FIG. 3 (308). Here is shown the count-in (305) followed by the first note (306).

Figure 4:
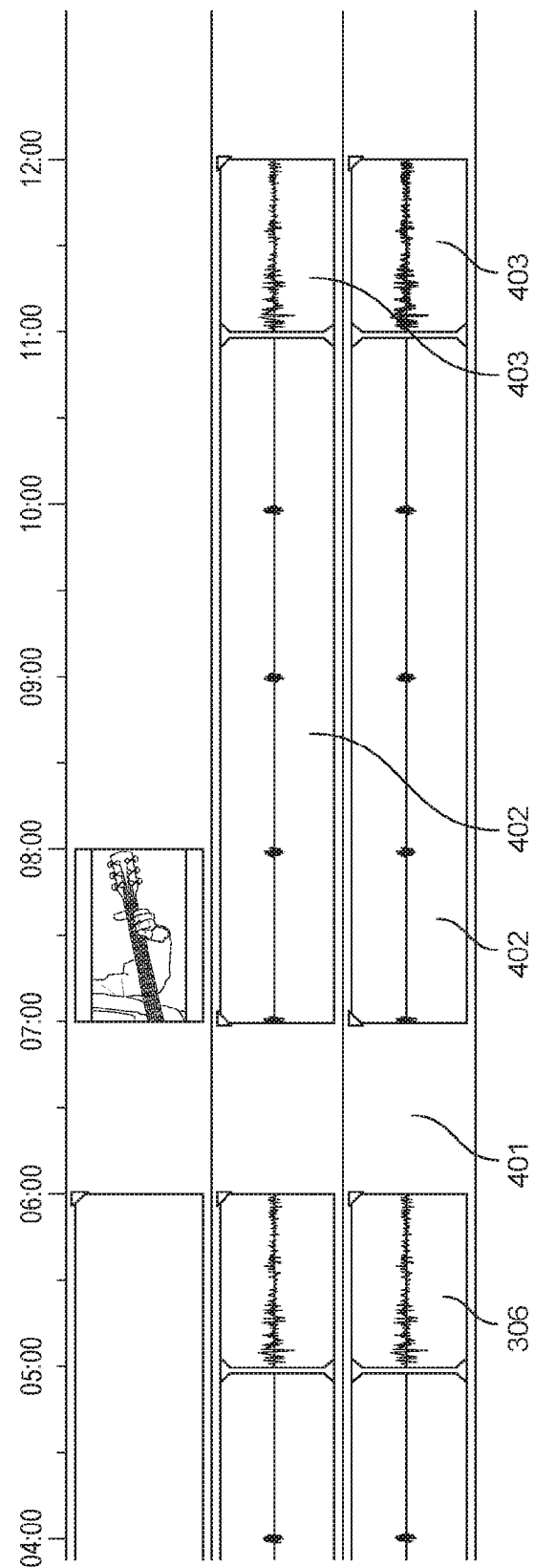

In FIG. 4 is shown the first note from FIG. 3 (306), followed by a short gap (401) followed by a copy of the count-in (402) followed by a copy of the first note again (403).

The video file can then be reopened in the timeline and cut this time to show (after the count-in) not one, but the first two notes played (501). Following a similar short gap as before (502), we can see the start of a copy of this section (503).

The intention for the end user, as described herein within the summary, is to watch and hear the notes being played each time, and then play along with them the second time, without needing to interrupt their concentration by taking hands off an instrument, or using a mouse/touch screen to start/stop/pause etc.

Figure 5:
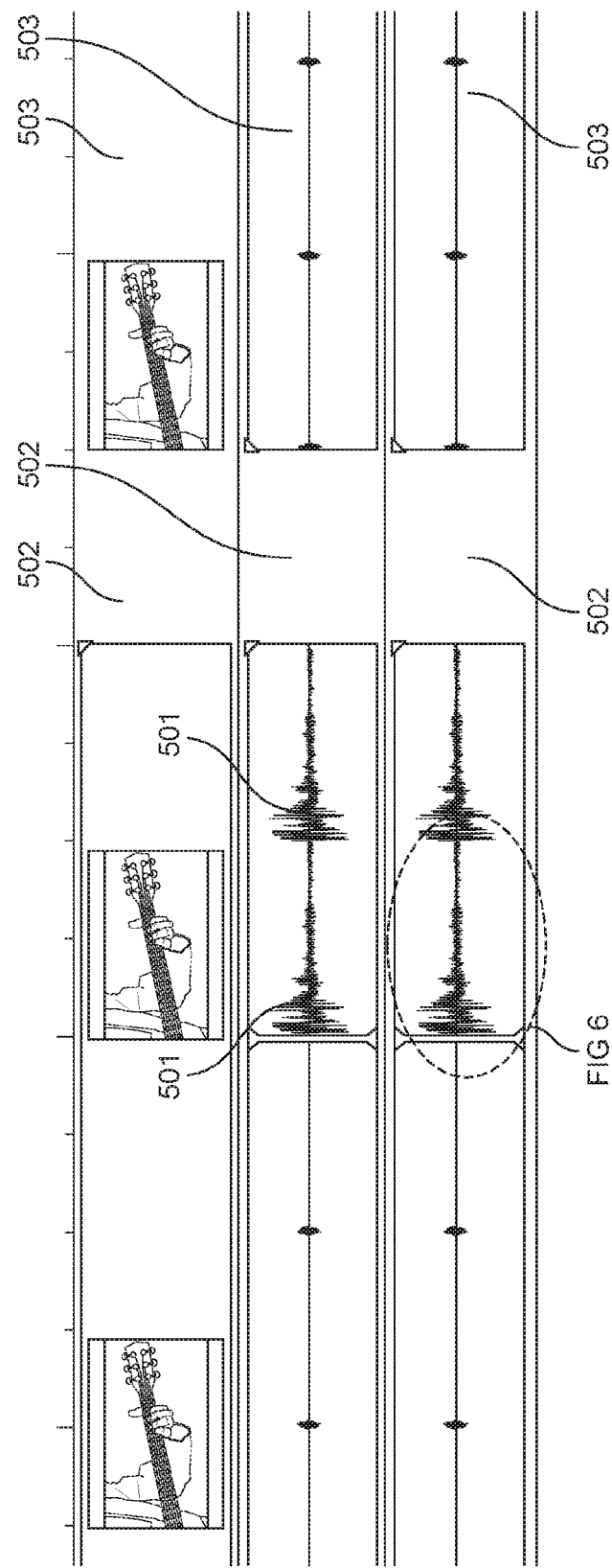

The section encircled in FIG. 5 (504) is used to show (FIG. 6) how the present invention deals with minor errors that may occur during performance/recording of musical phrases. These minor errors are well known amongst audio engineers, are typically small (10 to 20 milliseconds, which is 1 to 2 hundredths of a second), and such small imperfections are part of every human activity but need to be addressed when applying computer based processing techniques as used in digital video editing.

Figure 6:
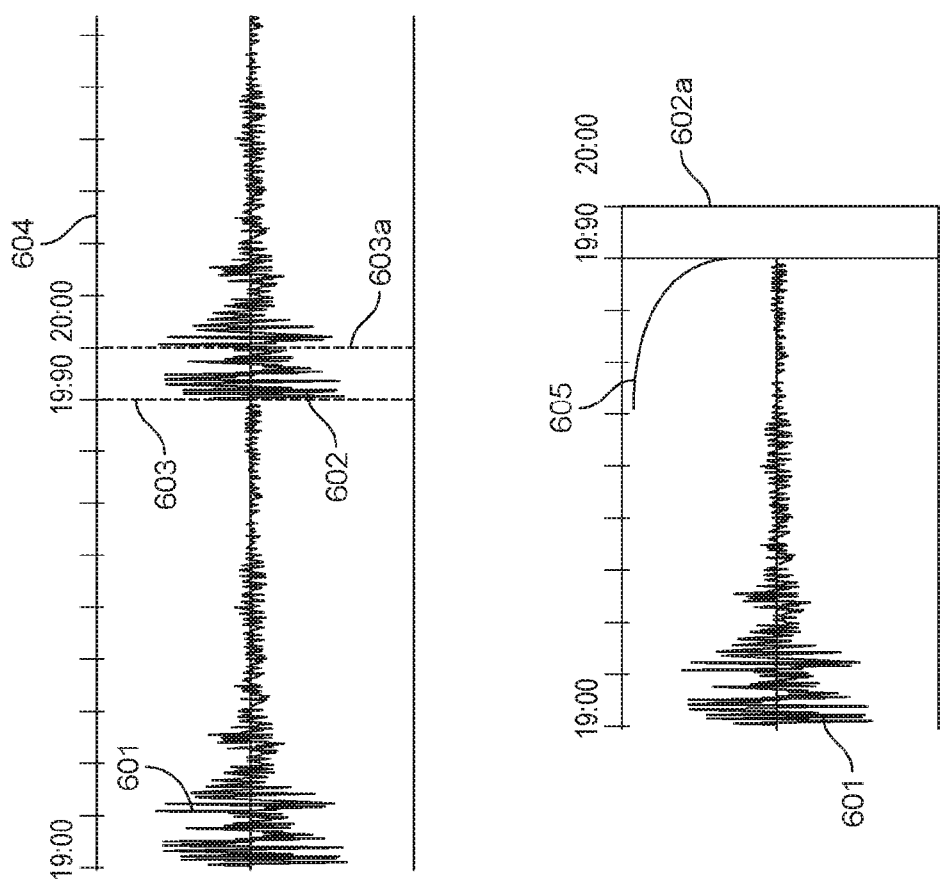

This is described herein. FIG. 6 shows the head of the second note (602) beginning one tenth of a second (100 milliseconds) too early (603) at a time of 19.90 seconds instead of at 20.00 seconds (603A).

In order to prevent the head of the note being heard, this section is cut (602A). A second quality control mechanism is employed as shown by the curved line (605) this is a graphic indication of an edit that reduces or fades the volume of the audio signal beneath the curved line. Should a minor error be such that it is not fully mitigated by a cut (602A), and part of the note head appears earlier than the cut point (19.90 seconds in this case), then its audible volume will be severely reduced to minimise any adverse effect upon the end user. Both of these degrees of tolerance can be set to fall within arbitrary desirable levels during creation of the templates. It should be noted that FIG. 6 depicts only a single audio track and that similar treatment may be applied to any other audio tracks used.

The final edited treatment of the first note shown in FIG. 6 (601) will replace the earlier depictions as shown in FIG. 4 (306 and 403).

Figure 7:
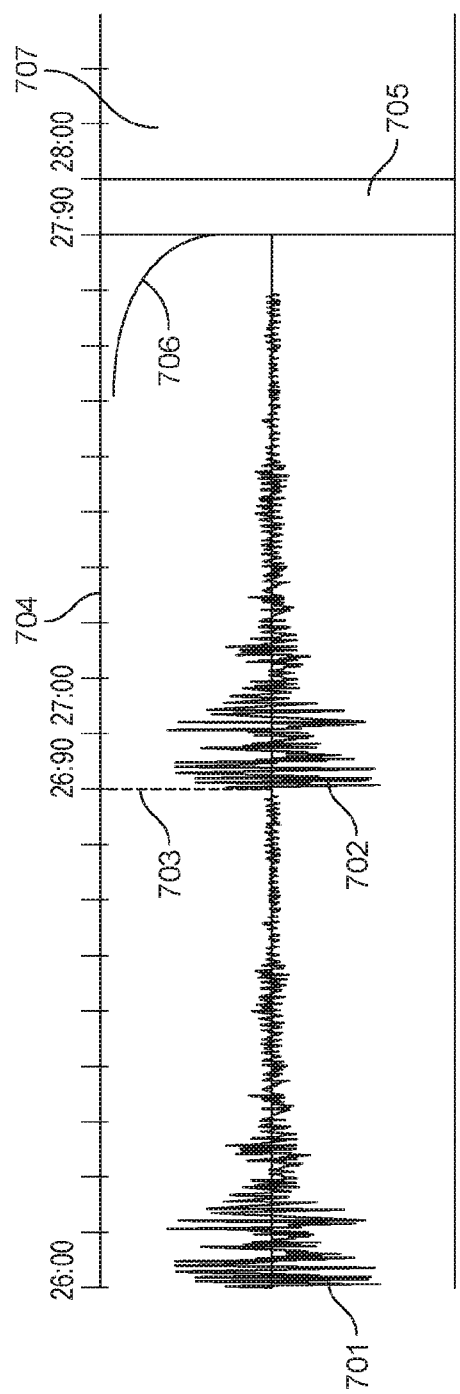

FIG. 7 shows the next step in the creation of the template where the head of the note which was cut in FIG. 6 (602) has now been left (702). FIG. 7 then shows both first and second notes (701 and 702), which also of course may be viewed being played in the accompanying video track.

At the end of the second note is shown the same treatment as before with the cut portion (705) now occurring after the figure of 27.90 seconds indicated in the timeline scale (704). Similarly any part of the third note that did not fall within (705) will be caught beneath the curved line shown (706).

FIG. 7 (707) also shows the gap that is left after each section of the template, as shown in FIG. 5 (502). As before, this section will be copied/repeated with the intention that the end user plays along with it using the finished video product.

Figure 8:
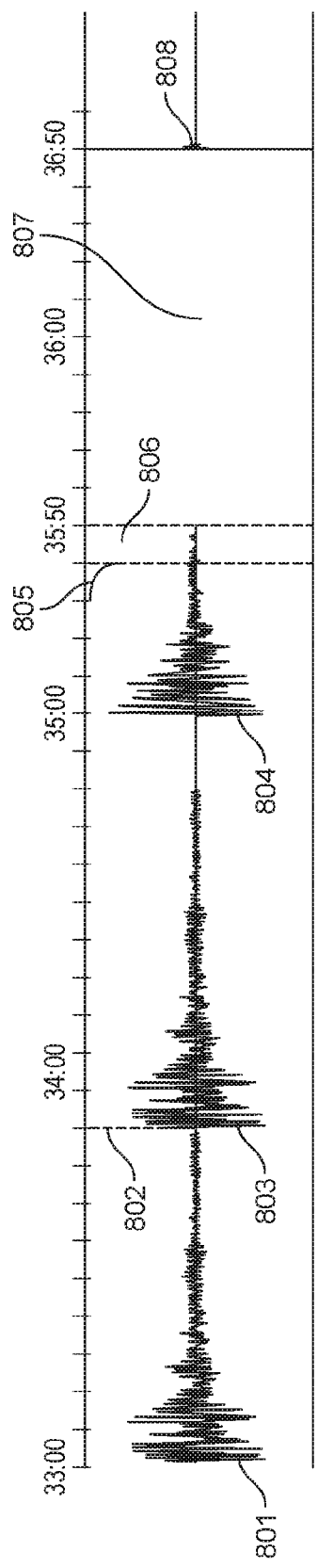

FIG. 8 shows a following section which includes the first three notes. It can be seen that the third note (804—a quaver) lasts approximately half the length of the first and second notes (801 and 803—crotchets). The end portion of this third note is still subject to the same treatment (806 and 805) as before to deal with the possibility of a premature fourth note. We can see a copy of the second note which starts slightly early as indicated in the scale on the timeline (802). Again we see a gap (807) included in the edit before the first metronome beat (808) that will begin the next section.

This process of adding a note is continued until it reaches the full musical phrase being used for a particular template as shown in FIG. 9. Following the metronome count-in shown again in (901), we can now see the audio tracks showing the full bar of music as shown in (902). We can see two crotchets of approximately one second duration, then two quavers, of 0.5 seconds each, and then a final crotchet. It should be noted there is no editing for rhythmic deviation after the last note in (902) as was illustrated in FIGS. 5, 6 and 7. This is because there is no following note which requires to be cut.

FIG. 10 shows a diagram of the basic system used during shooting of any videos being used either in creating a template, or to be processed through an existing template. An electronic metronome (1001) and a digital video camera or similar recording device (1002) are triggered to start simultaneously by a simple on/off switch (1004) through a simple junction box (1003).

This allows the setting of a uniform time prior to the first sound, of the metronome or instrument (FIGS. 3—303) which is constant for all videos to be used within a particular template thereby removing the need to edit new or replacement video files that are to be processed through the template of a preferred exemplary embodiment.

Figure 11:
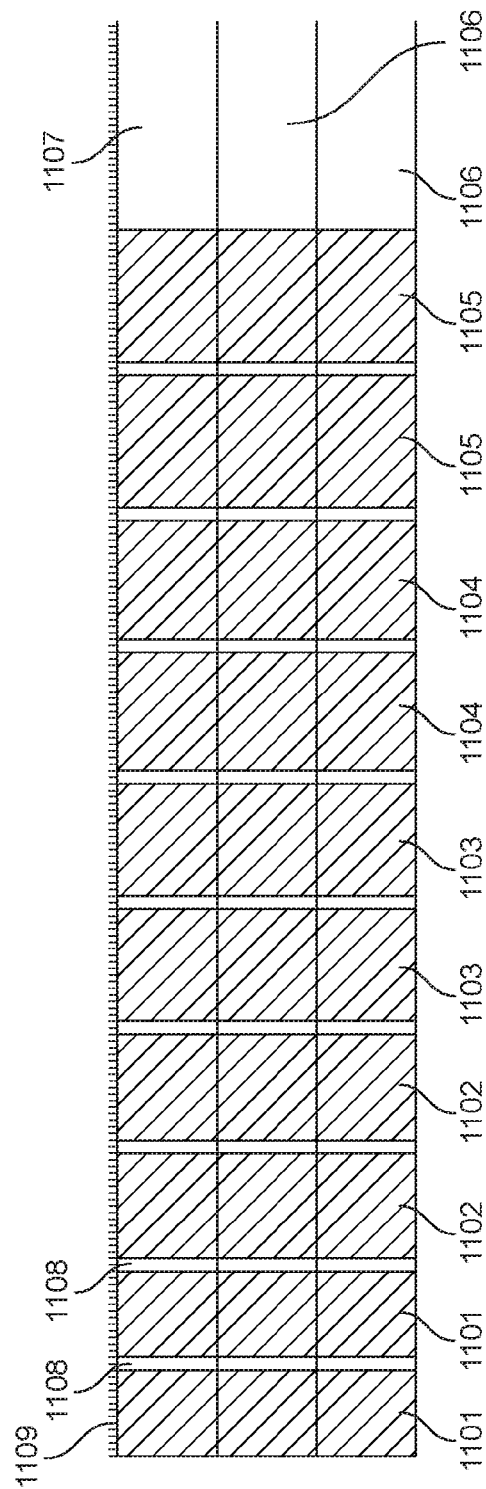
FIG. 11 shows a complete template within the timeline.

FIG. 11 shows an example of a completed template within the timeline. It will be noted that the template begins with shorter sections (1101) which gradually increase in length (1102 to 1105) as the sequence approaches the complete musical phrase to be learned, which appears at the end of the template (1105). The audio tracks (1106) and a video track (1107) containing the audio and video files being edited are illustrated as the three horizontal sections running across the timeline. The temporal gaps between sections (1108) and the length of each section (1101 to 1105) are measurable with reference to the scale above the timeline (1109). The scale itself is typically numbered using a combination of seconds and fractions of a second correlating to the frame rate of the video file being used, e.g., a video frame rate of 30 frames per second would be shown on the scale as increments of thirtieths of a second. The increase in length of any particular section of a template is proportional to the duration of the note or notes being added to said section, and also to the speed or tempo of the musical phrase. Text and narration may be added using additional tracks in other preferred embodiments.

Figure 12:
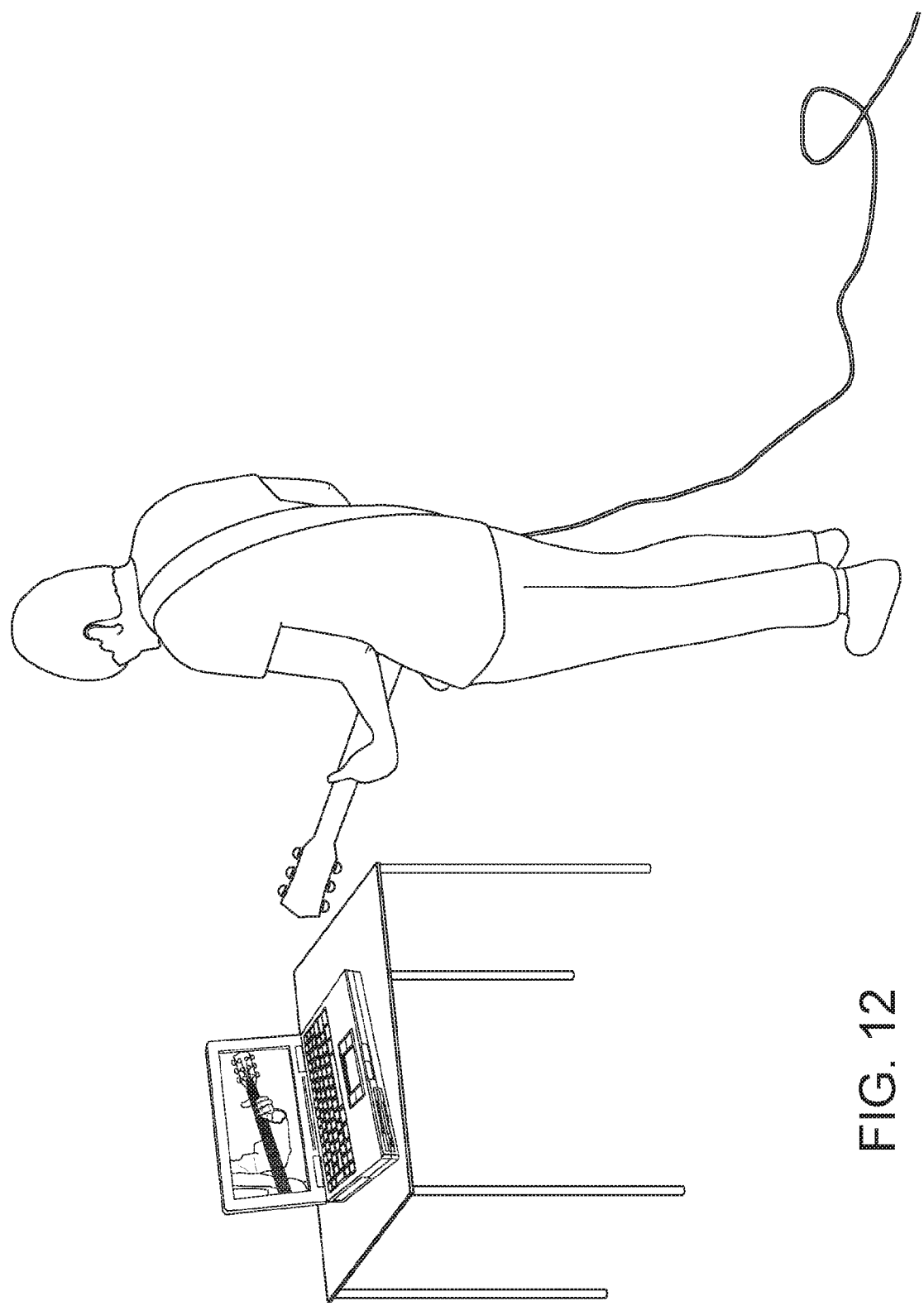
FIG. 12 provides a drawing of an example of the finished interactive multimedia presentation system that may embody the present invention and showing the end user engaging with the end product.

FIG. 12 shows the end product video being viewed by the end user, in this case a guitarist, but as stated herein this could be a person playing any musical instrument, or singing.

Figure 13:
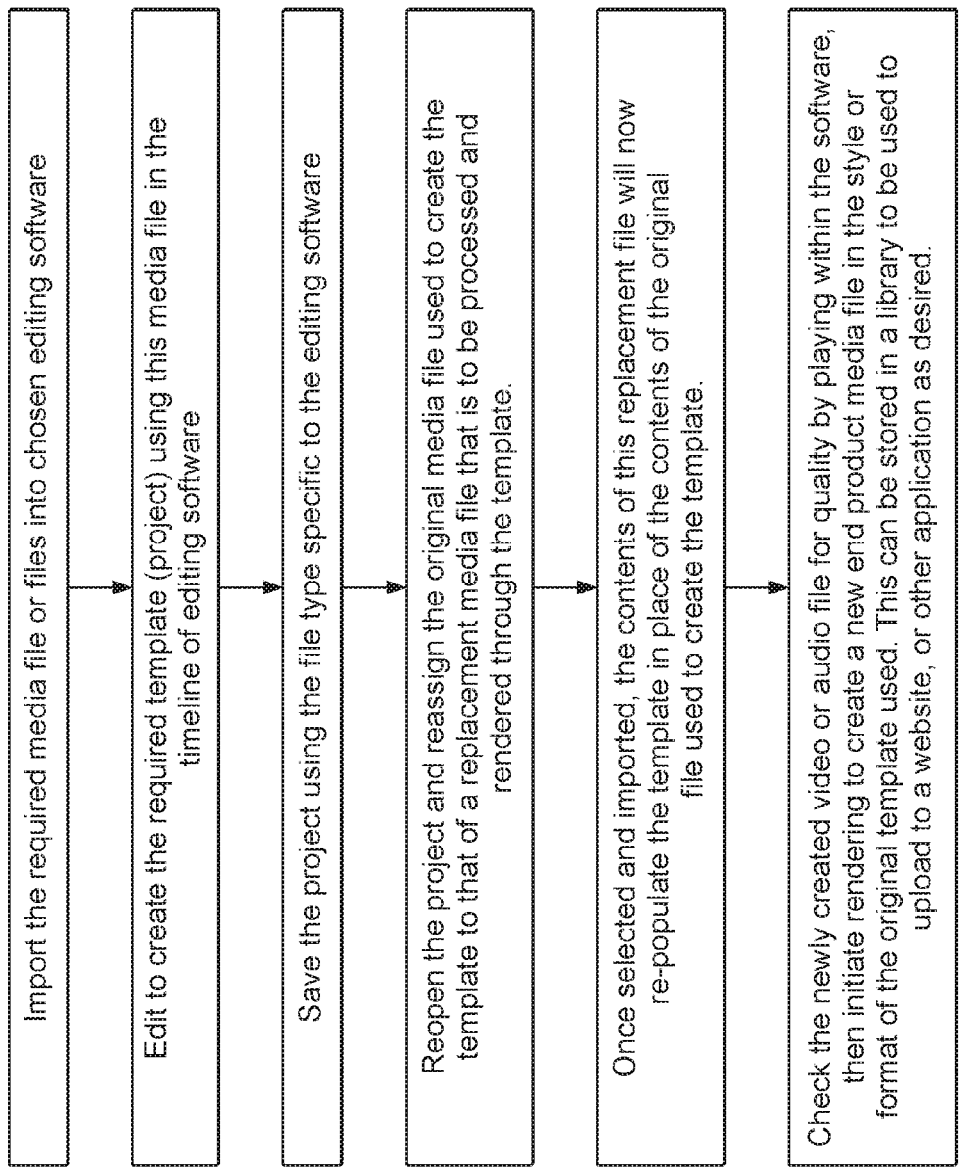
FIG. 13 provides a flow chart showing steps used in creating a template within proprietary software.

FIG. 13 is a diagram showing a sequence of steps that can be used to create a template.

When the creation of a digital template has been completed as described through FIGS. 2 to 11 using an original content video file such as has been shown imported into the editing software in FIG. 2 (201), the template itself can then be saved as a file in the file format of whichever video editing software has been used. Upon reopening this file within the editing software, there is an option to replace the original content video file which was used to create the template, with another video file. This other video file may show a demonstration of four entirely different notes (different pitches) being played on a different instrument or singing voice.

The template will then automatically edit, and thus recreate, the format or pattern of the first video and a new end product video can be easily produced by the process of video rendering, without any need to repeat the editing process as is described here. Video rendering is a process whereby a computer renders graphics and generates a full motion video playback version that can be viewed in real time. In compiling a library of templates as described here, there will be no need to carry out the lengthy process of separately editing each individual source video before rendering to create the end product video that is to be viewed by the end user.

The present disclosure also includes the following numbered clauses:

1. A computer assisted educational system or method incorporating digital multimedia files wherein information in the form of time varying audio visual content is stored on a non-transitory computer readable medium with instructions for execution by a processor and is displayed to a user in a sequentially cumulative manner said method comprising:
   a digital multimedia file wherein the information displayed includes that of a musician or singer performing a predetermined musical phrase incorporating notes or sounds of a musical instrument, including that of the human voice;
   wherein a first note or sound is demonstrated followed by one or more repeated demonstrations thereby allowing the user to copy and play along, followed by a demonstration of the first and second notes which is also subsequently repeated, followed by a demonstration of the first, second and third notes with repeats and so on until the said musical phrase of a predetermined length is completed;
   wherein at least some sections of said multimedia file contain the same notes or sounds contained in a previous section of said multimedia file with a sequential addition of one or more subsequent notes or sounds from the said musical phrase being demonstrated through said multimedia file;
   wherein the total number of notes or sounds introduced or added within any section of the said multimedia file is one or more;
   wherein the total number of repeats of a given section within said multimedia file is one or more; and
   wherein the total number of camera angles depicted within said multimedia file is one or more.
2. The method of clause 1 wherein said multimedia file is that of an audio file without video.
3. The method of clauses 1 or 2 wherein any of a plurality of speeds or tempi are incorporated within any section of the musical phrase within said multimedia file.
4. The method of clause 1 wherein a metronome is heard throughout said multimedia file.
5. The method of clause 1 wherein an audio backing track comprising an ensemble of additional rhythmic musical sounds is incorporated into said multimedia file to replace the sound of the metronome but not the function.
6. The method of clause 3 wherein a means for varying the playback speed of said multimedia file by the user is incorporated.
7. The method of clause 1 where additional text is included within said multimedia file.
8. The method of clause 1 which includes a variation of colour background depicted during or between sections of said multimedia file.
9. The method of clause 1 whereby still images are incorporated within said multimedia file.
10. The method of clause 1 wherein a chord or plurality of simultaneous sounds is depicted within any section of said multimedia file in place of or in addition to a single note or sound.
11. A computer-assisted system or method which enables the automatic cutting and editing of multimedia files containing time varying content on a non-transitory computer readable storage medium, said method culminating in the production of entirely new multimedia files and comprising:
   a) a library of reusable digital templates created within any of a plurality of proprietary digital video editing software for the purpose of the production or manufacturing of instructional multimedia files within the field of music education;
   wherein,
   the term digital template is defined as a completed edit, editing process or project when referred to using standard video editing terminology;
   wherein,
   said digital templates are created within said video editing software by means of a process comprising a cumulative iteration of sequential sections of the time varying content contained within said multimedia files used in the construction of said digital templates;
   wherein,
   the term cumulative iterations shall be defined as:
   a series of successive sections of said digital templates at least some of which contain an incrementally larger amount of data in the form of musical notes/sounds/images than that which is contained within preceding sections of said digital templates;
   b) the employment of said library of digital templates in the manufacture and facilitation of a library of end product instructional multimedia files stored on a non-transitory computer readable medium with instructions for execution by a processor.

12. The method of clause 11 wherein at least some sections of said digital templates contain an identical amount of data as a preceding section of said digital templates.
13. The method of clause 11 wherein each or any of said digital templates may be repopulated by means of the replacement of the original media file or files used to create said digital template with other media files comprising different video and/or audio content but which contain the same rhythmic structure as that contained within the said original media file or files used to create the said digital template.
14. The methods of clause 11 to 13 where said media files used to replace said original media files may contain content which differs from said original media files in terms of the parameters of pitch, loudness, camera angles and musical instrument being depicted.
15. The method of clauses 11 to 14 wherein the uniformity of time between the start of a video or audio media file to the first note of the musical phrase being depicted is preserved during the filming or recording of both the media file used to create a digital template and a replacement media file pending the importing and processing of said replacement media file through said digital template;
wherein,
said uniformity of time is preserved by means of a switch which simultaneously starts both one or more video cameras or recording devices and a metronome;
wherein,
said metronome delivers a cue that is uniform in its duration across all said media files.
16. The method of clause 11 wherein an editing cut is made at a point slightly ahead of the first new note or sound that is added to a subsequent section of a digital template serving to act as a tolerance parameter;
wherein,
any notes incorporated within a replacement media file that have been played ahead of time due to human performance error of a musician, are eliminated from the end of the preceding section of the said digital template and will be heard instead within the section they were intended to be heard in.
17. An audio visual system for the acquisition or learning of performance skills on a musical instrument, including that of the human singing voice, by emulation or imitation of the information displayed in a video wherein all parts are embodied in non-transitory computer readable storage media comprising:
a processor, an input device operable to receive audio and video data, video and audio engines able to transform said data into output data, and a database operable to store audiovisual files for access on a non-transitory computer readable storage medium.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s).

The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:
1. A method of presenting a media file enabling a user to emulate musical content therein, wherein the media file comprises a plurality of segments, each segment representing a demonstration of at least part of a musical phrase comprising one or more musical notes of a piece of music, the method comprising:
presenting a first segment of the plurality of segments for emulation by the user, followed by an opportunity for the user to emulate the one or more musical notes of the first segment;
subsequently presenting the first segment followed by a second segment of the plurality of segments for emulation by the user, followed by an opportunity for the user to emulate the musical notes of the first and second segments;
subsequently presenting the previously presented segments followed by additional segments, followed by an opportunity for the user to emulate the musical notes of the presented segments, until all of the plurality of segments have been presented for emulation by the user, wherein the segments are presented for emulation by the user in the order in which they occur in the piece of music.

2. The method of claim 1, wherein the media file comprises an audio representation of the piece of music.

3. The method of claim 2, wherein the media file comprises a first video representation of the piece of music.

4. The method of claim 3, wherein the media file comprises a further video representation of the piece of music shown from a different angle than the first video representation.

5. The method of claim 1, wherein the media file comprises text and/or still images relating to performance of the piece of music.

6. The method of claim 1, wherein the media file comprises metadata defining a tempo at which at least one of the plurality of segments is to be presented.

7. The method of claim 1, wherein a tempo at which at least one of the plurality of segments is presented is controllable by the user.

8. The method of claim 1, wherein presenting at least one of the plurality of segments further comprises simultaneously presenting an audio metronome at a corresponding tempo to the at least one segment.

9. The method of claim 1, wherein presenting at least one of the plurality of segments further comprises simultaneously presenting an audio backing track at a corresponding tempo to the at least one segment.

10. A computer program comprising instructions which, when the program is executed by a computer, cause the computer to carry out the steps of claim 1.

11. A method of generating an output media file from an input media file, the output media file for use in a method according to claim 1, the output media file enabling a user to emulate musical content therein, wherein the input media file comprises an unedited demonstration of a piece of music, the method comprising:

segmenting the input media file into a plurality of segments using a plurality of predetermined time intervals specified in a template, each segment representing at least part of a musical phrase comprising one or more musical notes of the piece of music, and combining the plurality of segments in a predetermined order specified in the template to generate the output media file, wherein the output media file comprises:

a first segment of the plurality of segments for emulation by the user, followed by an opportunity for the user to emulate the one or more musical notes of the first segment;

the first segment followed by a second segment of the plurality of segments for emulation by the user, followed by an opportunity for the user to emulate the musical notes of the first and second segments; and the previously presented segments followed by additional segments, followed by an opportunity for the user to emulate the musical notes of the presented segments, until all of the plurality of segments have been included in the output media file, wherein the segments are presented for emulation by the user in the order in which they occur in the music.

12. The method of claim 11, wherein the template is selected from a plurality of templates based on the musical rhythm of the piece of music.

13. The method of claim 11, wherein the time intervals are tuneable to account for variations in the demonstration.

14. The method of claim 11, wherein the time intervals are tuneable to account for musical notes that are played ahead of time in the demonstration.

* * * * *